(12) United States Patent
Liu

(10) Patent No.: US 11,733,491 B2
(45) Date of Patent: Aug. 22, 2023

(54) CAMERA OPTICAL LENS INCLUDING SIX LENSES OF ++−−+−,++−++− OR ++−+++ REFRACTIVE POWERS

(71) Applicant: AAC Optics (Changzhou) Co., Ltd., Changzhou (CN)

(72) Inventor: Li Liu, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 457 days.

(21) Appl. No.: 17/129,931

(22) Filed: Dec. 22, 2020

(65) Prior Publication Data
US 2021/0263277 A1 Aug. 26, 2021

(30) Foreign Application Priority Data
Feb. 24, 2020 (CN) .......................... 202010111313.X

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC .............................. G02B 13/0045; G02B 9/60
See application file for complete search history.

(56) References Cited

U.S. PATENT DOCUMENTS

2019/0121065 A1* 4/2019 Wenren .................... G02B 9/64

* cited by examiner

*Primary Examiner* — Wen Huang
(74) *Attorney, Agent, or Firm* — W&G Law Group

(57) ABSTRACT

Provided is a camera optical lens including a first lens having a positive refractive power, a second lens having a positive refractive power, a third lens having a negative refractive power, a fourth lens, a fifth lens having a positive refractive power, and a sixth lens. The camera optical lens satisfies: $5.00 \leq f1/f \leq 20.00$; $12.00 \leq (R7+R8)/(R7-R8)$; and $2.00 \leq (R11+R12)/(R11-R12) \leq 8.00$, where f denotes a focal length of the camera optical lens; f1 denotes a focal length of the first lens; R7 and R8 denote curvature radiuses of an object side surface and an image side surface of the fourth lens, respectively; and R11 and R12 denote curvature radiuses of an object side surface and an image side surface of the sixth lens, respectively. The camera optical lens can achieve good optical performance while satisfying design requirements for ultra-thin, wide-angle lenses having large apertures.

10 Claims, 12 Drawing Sheets

CAMERA OPTICAL LENS INCLUDING SIX LENSES OF ++−−+−,++−++− OR ++−+++ REFRACTIVE POWERS

TECHNICAL FIELD

The present disclosure relates to the field of optical lens, and more particularly, to a camera optical lens suitable for handheld terminal devices such as smart phones or digital cameras and camera devices such as monitors or PC lenses.

BACKGROUND

With the emergence of smart phones in recent years, the demand for miniature camera optical lens is increasingly higher, but in general the photosensitive devices of camera optical lens are nothing more than Charge Coupled Devices (CCDs) or Complementary Metal-Oxide Semiconductor Sensors (CMOS sensors). As the progress of the semiconductor manufacturing technology makes the pixel size of the photosensitive devices become smaller, plus the current development trend of electronic products towards better functions and thinner and smaller dimensions, miniature camera optical lenses with good imaging quality have become a mainstream in the market.

In order to obtain better imaging quality, the lens that is conventionally equipped in mobile phone cameras adopts a three-piece or four-piece lens structure. Also, with the development of technology and the increasingly diverse demands from users, the pixel area of photosensitive devices is becoming smaller and smaller and the requirement of the system on the imaging quality is increasingly higher, and thus a six-piece lens structure gradually emerges in lens designs. It is urgent to provide a wide-angle camera lens, which has excellent optical characteristics, is ultra-thin and can fully correct chromatic aberrations.

SUMMARY

In view of the problems, the present disclosure provides a camera optical lens, which can achieve good optical performance while satisfying design requirements for ultra-thin, wide-angle lenses.

In an embodiment, the present disclosure provides a camera optical lens. The camera optical lens includes, from an object side to an image side, a first lens having a positive refractive power, a second lens having a positive refractive power, a third lens having a negative refractive power, a fourth lens, a fifth lens having a positive refractive power, and a sixth lens. The camera optical lens satisfies following conditions: $5.00 \leq f1/f \leq 20.00$; $12.00 \leq (R7+R8)/(R7-R8)$; and $2.00 \leq (R11+R12)/(R11-R12) \leq 8.00$, where f denotes a focal length of the camera optical lens; f1 denotes a focal length of the first lens; R7 denotes a curvature radius of an object side surface of the fourth lens; R8 denotes a curvature radius of an image side surface of the fourth lens; R11 denotes a curvature radius of an object side surface of the sixth lens; and R12 denotes a curvature radius of an image side surface of the sixth lens.

As an improvement, the camera optical lens further satisfies a following condition of $10.00 \leq d3/d4 \leq 18.00$, where d3 denotes an on-axis thickness of the second lens; and d4 denotes an on-axis distance from an image side surface of the second lens to an object side surface of the third lens.

As an improvement, the camera optical lens further satisfies following conditions: $-29.60 \leq (R1+R2)/(R1-R2) \leq -1.38$; and $0.02 \leq d1/TTL \leq 0.07$, where R1 denotes a curvature radius of an object side surface of the first lens; R2 denotes a curvature radius of an image side surface of the first lens; d1 denotes an on-axis thickness of the first lens; and TTL denotes a total optical length from the object side surface of the first lens to an image plane of the camera optical lens along an optic axis.

As an improvement, the camera optical lens further satisfies following conditions: $0.41 \leq f2/f \leq 1.69$; $0.35 \leq (R3+R4)/(R3-R4) \leq 1.80$; and $0.04 \leq d3/TTL \leq 0.18$, where f2 denotes a focal length of the second lens; R3 denotes a curvature radius of an object side surface of the second lens; R4 denotes a curvature radius of an image side surface of the second lens; d3 denotes an on-axis thickness of the second lens; and TTL denotes a total optical length from an object side surface of the first lens to an image plane of the camera optical lens along an optic axis.

As an improvement, the camera optical lens further satisfies following conditions: $-2.75 \leq f3/f \leq -0.71$; $0.37 \leq (R5+R6)/(R5-R6) \leq 1.62$; and $0.02 \leq d5/TTL \leq 0.07$, where f3 denotes a focal length of the third lens; R5 denotes a curvature radius of an object side surface of the third lens; R6 denotes a curvature radius of an image side surface of the third lens; d5 denotes an on-axis thickness of the third lens; and TTL denotes a total optical length from an object side surface of the first lens to an image plane of the camera optical lens along an optic axis.

As an improvement, the camera optical lens further satisfies following conditions: $-641.12 \leq f4/f \leq 923.07$; and $0.03 \leq d7/TTL \leq 0.15$, where f4 denotes a focal length of the fourth lens; d7 denotes an on-axis thickness of the fourth lens; and TTL denotes a total optical length from an object side surface of the first lens to an image plane of the camera optical lens along an optic axis.

As an improvement, the camera optical lens further satisfies following conditions: $0.27 \leq f5/f \leq 2.70$; $0.86 \leq (R9+R10)/(R9-R10) \leq 8.97$; and $0.06 \leq d9/TTL \leq 0.26$, where f5 denotes a focal length of the fifth lens; R9 denotes a curvature radius of an object side surface of the fifth lens; R10 denotes a curvature radius of an image side surface of the fifth lens; d9 denotes an on-axis thickness of the fifth lens; and TTL denotes a total optical length from an object side surface of the first lens to an image plane of the camera optical lens along an optic axis.

As an improvement, the camera optical lens further satisfies following conditions: $-1.80 \leq f6/f \leq 1759.30$; and $0.05 \leq d11/TTL \leq 0.19$, where f6 denotes a focal length of the sixth lens; d11 denotes an on-axis thickness of the sixth lens; and TTL denotes a total optical length from the object side surface of the first lens to an image plane of the camera optical lens along an optic axis.

As an improvement, the camera optical lens further satisfies a following condition of $TTL/IH \leq 1.42$, where TTL denotes a total optical length from the object side surface of the first lens to an image plane of the camera optical lens along an optic axis; and IH denotes an image height of the camera optical lens.

As an improvement, the camera optical lens further satisfies a following condition of $FOV \geq 100.00°$, where FOV denotes a field of view of the camera optical lens.

The present disclosure has advantageous effects in that the camera optical lens according to the present disclosure has excellent optical characteristics and is ultra-thin and wide-angle, such that is especially suitable for camera optical lens assembly of mobile phones and WEB camera optical lenses formed by high-pixel camera elements such as CCD and CMOS.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
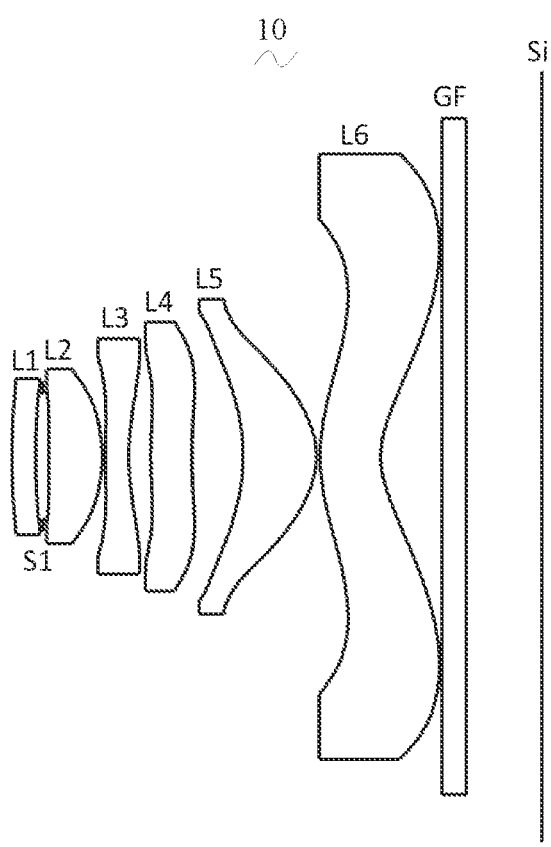
FIG. 1 is a schematic diagram of a structure of a camera optical lens according to Embodiment 1 of the present disclosure.

Referring to FIG. 1, the present disclosure provides a camera optical lens 10. FIG. 1 shows the camera optical lens 10 according to Embodiment 1 of the present disclosure. The camera optical lens 10 includes 6 lenses. For example, the camera optical lens 10 includes, from an object side to an image side, a first lens L1, an aperture S1, a second lens L2, a third lens L3, a fourth lens L4, a fifth lens L5, and a sixth lens L6. An optical element such as an optical filter (GF) can be arranged between the sixth lens L6 and an image plane Si.

The first lens L1 has a positive refractive power, the second lens L2 has a negative refractive power, the third lens L3 has a negative refractive power, the fourth lens L4 has a negative refractive power, the fifth lens L5 has a positive refractive power, and the sixth lens L6 has a negative refractive power.

The first lens L1 is made of a plastic material, the second lens L2 is made of a plastic material, the third lens L3 is made of a plastic material, the fourth lens L4 is made of a plastic material, the fifth lens L5 is made of a plastic material, and the sixth lens L6 is made of a plastic material.

In the present embodiment, a focal length of the camera optical lens 10 is defined as f, and a focal length of the first lens L1 is defined as f1. The camera optical lens 10 should satisfy a condition of $5.00 \leq f1/f \leq 20.00$, which specifies a ratio of the focal length f1 of the first lens L1 to the focal length f of the system. When the condition is satisfied, a spherical aberration and the field curvature of the system can be effectively balanced. As an example, $5.04 \leq f1/f \leq 19.95$.

A curvature radius of an object side surface of the fourth lens L4 is defined as R7, and a curvature radius of an image side surface of the fourth lens L4 is defined as R8. The camera optical lens 10 should satisfy a condition of $12.00 \leq (R7+R8)/(R7-R8)$, which specifies a shape of the fourth lens L4. This condition can alleviate the deflection of light passing through the lens while effectively reducing aberrations. As an example, $12.03 \leq (R7+R8)/(R7-R8)$.

A curvature radius of an object side surface of the sixth lens L6 is defined as R11, and a curvature radius of an image side surface of the sixth lens L6 is defined as R12. The camera optical lens 10 should satisfy a condition of $2.00 \leq (R11+R12)/(R11-R12) \leq 8.00$, which specifies a shape of the sixth lens L6. This condition can facilitate the correction of an off-axis aberration with development towards ultra-thin, wide-angle lenses. As an example, $2.01 \leq (R11+R12)/(R11-R12) \leq 7.89$.

An on-axis thickness of the second lens L2 is defined as d3, and an on-axis distance from an image side surface of the second lens L2 to an object side surface of the third lens L3 is defined as d4. The camera optical lens 10 should satisfy a condition of $10.00 \leq d3/d4 \leq 18.00$, which specifies a ratio of the thickness of the second lens L2 and an air interval between the second lens L2 and the third lens L3. This condition facilitates the reduction of a total length of the optical system while achieving the ultra-thin effect. As an example, $10.03 \leq d3/d4 \leq 17.95$.

In the present embodiment, the first lens L1 includes an object side surface being convex in a paraxial region and an image side surface being concave in the paraxial region.

A curvature radius of the object side surface of the first lens L1 is defined as R1, and a curvature radius of the image side surface of the first lens L1 is defined as R2. The camera optical lens 10 should satisfy a condition of $-29.60 \leq (R1+R2)/(R1-R2) \leq -1.38$, which can appropriately control a shape of the first lens L1, allowing the first lens L1 to effectively correct spherical aberrations of the system. As an example, $-18.50 \leq (R1+R2)/(R1-R2) \leq -1.73$.

A total optical length from the object side surface of the first lens L1 to an image plane of the camera optical lens 10 along an optic axis is defined as TTL, and an on-axis thickness of the first lens L1 is defined as d1. The camera optical lens 10 should satisfy a condition of $0.02 \leq d1/TTL \leq 0.07$, which can achieve the ultra-thin lenses. As an example, $0.04 \leq d1/TTL \leq 0.06$.

In the present embodiment, the second lens L2 includes an object side surface being convex in a paraxial region and an image side surface being convex in the paraxial region.

The focal length of the camera optical lens 10 is f, and a focal length of the second lens L2 is f2. The camera optical lens 10 further satisfies a condition of $0.41 \le f2/f \le 1.69$. By controlling a positive refractive power of the second lens L2 within an appropriate range, the aberrations of the optical system can be advantageously corrected. As an example, $0.65 \le f2/f \le 1.35$.

A curvature radius of the object side surface of the second lens L2 is defined as R3, and a curvature radius of the image side surface of the second lens L2 is defined as R4. The camera optical lens 10 should satisfy a condition of $0.35 \le (R3+R4)/(R3-R4) \le 1.80$, which specifies a shape of the second lens L2. This condition can facilitate the correction of an on-axis aberration with development towards ultra-thin lenses. As an example, $0.57 \le (R3+R4)/(R3-R4) \le 1.44$.

An on-axis thickness of the second lens L2 is defined as d3, and the total optical length from the object side surface of the first lens L1 to an image plane of the camera optical lens 10 along an optic axis is defined as TTL. The camera optical lens 10 should satisfy a condition of $0.04 \le d3/TTL \le 0.18$, which can achieve the ultra-thin lenses. As an example, $0.07 \le d3/TTL \le 0.14$.

In the present embodiment, the third lens L3 includes an object side surface being convex in a paraxial region and an image side surface being concave in the paraxial region.

The focal length of the camera optical lens 10 is defined as f, and a focal length of the third lens L3 is defined as f3. The camera optical lens 10 further satisfies a condition of $-2.75 \le f3/f \le -0.71$. The appropriate distribution of the refractive power leads to better imaging quality and a lower sensitivity of the system. As an example, $-1.72 \le f3/f \le -0.88$.

A curvature radius of the object side surface of the third lens L3 is defined as R5, and a curvature radius of the image side surface of the third lens L3 is defined as R6. The camera optical lens 10 should satisfy a condition of $0.37 \le (R5+R6)/(R5-R6) \le 1.62$, which can effectively control a shape of the third lens L3, thereby facilitating the shaping of the third lens L3. This condition can alleviate the deflection of light passing through the lens while effectively reducing aberrations. As an example, $0.59 \le (R5+R6)/(R5-R6) \le 1.29$.

An on-axis thickness of the third lens L3 is defined as d5, and the total optical length from the object side surface of the first lens L1 to an image plane of the camera optical lens 10 along an optic axis is defined as TTL. The camera optical lens 10 should satisfy a condition of $0.02 \le d5/TTL \le 0.07$, which can achieve the ultra-thin lenses. As an example, $0.04 \le d5/TTL \le 0.05$.

In the present disclosure, the fourth lens L4 includes an object side surface being convex in a paraxial region and an image side surface being concave in the paraxial region.

The focal length of the camera optical lens 10 is f, and a focal length of the fourth lens L4 is f4. The camera optical lens 10 further satisfies a condition of $-641.12 \le f4/f \le 923.07$. The appropriate distribution of the refractive power leads to better imaging quality and a lower sensitivity of the system. As an example, $-400.70 \le f4/f \le 738.46$.

An on-axis thickness of the fourth lens L4 is defined as d7, and the total optical length from the object side surface of the first lens L1 to an image plane of the camera optical lens 10 along an optic axis is defined as TTL. The camera optical lens 10 should satisfy a condition of $0.03 \le d7/TTL \le 0.15$, which can achieve the ultra-thin lenses. As an example, $0.05 \le d7/TTL \le 0.12$.

In the present embodiment, the fifth lens L5 includes an object side surface being concave in a paraxial region and an image side surface being convex in the paraxial region.

The focal length of the camera optical lens 10 is f, and a focal length of the fifth lens L5 is f5. The camera optical lens 10 should satisfy a condition of $0.27 \le f5/f \le 2.70$. The limitation on the fifth lens L5 can effectively make a light angle of the camera optical lens 10 gentle and reduce the tolerance sensitivity. As an example, $0.44 \le f5/f \le 2.16$.

A curvature radius of the object side surface of the fifth lens L5 is defined as R9, and a curvature radius of the image side surface of the fifth lens L5 is defined as R10. The camera optical lens 10 should satisfy a condition of $0.86 \le (R9+R10)/(R9-R10) \le 8.97$, which specifies a shape of the fifth lens L5. This condition can facilitate the correction of an off-axis aberration with development towards ultra-thin lenses. As an example, $1.38 \le (R9+R10)/(R9-R10) \le 7.17$.

An on-axis thickness of the fifth lens L5 is defined as d9, and the total optical length from the object side surface of the first lens L1 to an image plane of the camera optical lens 10 along an optic axis is defined as TTL. The camera optical lens 10 should satisfy a condition of $0.06 \le d9/TTL \le 0.26$, which can achieve the ultra-thin lenses. As an example, $0.09 \le d9/TTL \le 0.21$.

In the present embodiment, the sixth lens L6 includes an object side surface being convex in a paraxial region and an image side surface being concave in the paraxial region.

The focal length of the camera optical lens 10 is defined as f, and a focal length of the sixth lens L6 is defined as f6. The camera optical lens 10 further satisfies a condition of $-1.80 \le f6/f \le 1759.30$. The appropriate distribution of the refractive power leads to better imaging quality and a lower sensitivity of the system. As an example, $-1.12 \le f6/f \le 1407.44$.

An on-axis thickness of the sixth lens L6 is defined as d11, and the total optical length from the object side surface of the first lens L1 to an image plane of the camera optical lens 10 along an optic axis is defined as TTL. The camera optical lens 10 should satisfy a condition of $0.05 \le d11/TTL \le 0.19$, which can achieve the ultra-thin lenses. As an example, $0.08 \le d11/TTL \le 0.16$.

In the present embodiment, the total optical length of the camera optical lens 10 is defined as TTL, and an image height of the camera optical lens 10 is defined as IH. The camera optical lens 10 should satisfy a condition of $TTL/IH \le 1.42$, which can achieve the ultra-thin lenses.

In the present embodiment, a field of view (FOV) of the camera optical lens 10 is larger than or equal to 100°, thereby leading to wide-angle lenses.

In the present embodiment, the focal length of the camera optical lens 10 is defined as f, and a combined focal length of the first lens L1 and the second lens L2 is defined as f12. The camera optical lens 10 should satisfy a condition of $0.39 \le f12/f \le 1.44$, which can eliminate aberration and distortion of the camera optical lens 10, suppress the back focal length of the camera optical lens 10, and maintain the miniaturization of the camera lens system group. As an example, $0.63 \le f12/f \le 1.15$.

When the above conditions are satisfied, the camera optical lens 10 can have good optical performance while satisfying design requirements for ultra-thin, wide-angle lenses. With these characteristics, the camera optical lens 10 is especially suitable for high-pixel camera optical lens assembly of mobile phones and WEB camera optical lenses formed by imaging elements such as CCD and CMOS.

The following examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: total optical length (total optical length from the object side surface of the first lens L1 to the image plane of the camera optical lens along the optic axis) in mm.

In an example, inflexion points and/or arrest points can be arranged on the object side surface and/or image side surface of the lens, in order to satisfy the demand for the high quality imaging. The specific implementations are described below.

Table 1 and Table 2 shows design data of the camera optical lens 10 according to Embodiment 1 of the present disclosure.

TABLE 1

|  | R | d | nd | | vd | |
|---|---|---|---|---|---|---|
| S1 | ∞ | d0 = −0.264 | | | | |
| R1 | 5.025 | d1 = 0.204 | nd1 | 1.6701 | v1 | 19.39 |
| R2 | 6.034 | d2 = 0.110 | | | | |
| R3 | 26.766 | d3 = 0.453 | nd2 | 1.5661 | v2 | 37.71 |
| R4 | −1.415 | d4 = 0.030 | | | | |
| R5 | 59.552 | d5 = 0.200 | nd3 | 1.6701 | v3 | 19.39 |
| R6 | 2.214 | d6 = 0.185 | | | | |
| R7 | 3.631 | d7 = 0.349 | nd4 | 1.5444 | v4 | 55.82 |
| R8 | 3.481 | d8 = 0.438 | | | | |
| R9 | −1.653 | d9 = 0.625 | nd5 | 1.5346 | v5 | 55.69 |
| R10 | −0.682 | d10 = 0.030 | | | | |
| R11 | 1.672 | d11 = 0.515 | nd6 | 1.6701 | v6 | 19.39 |
| R12 | 0.721 | d12 = 0.520 | | | | |
| R13 | ∞ | d13 = 0.210 | ndg | 1.5168 | vg | 64.17 |
| R14 | ∞ | d14 = 0.641 | | | | |

In the table, meanings of various symbols will be described as follows.

S1: aperture;

R: curvature radius of an optical surface, a central curvature radius of a lens;

R1: curvature radius of the object side surface of the first lens L1;

R2: curvature radius of the image side surface of the first lens L1;

R3: curvature radius of the object side surface of the second lens L2;

R4: curvature radius of the image side surface of the second lens L2;

R5: curvature radius of the object side surface of the third lens L3;

R6: curvature radius of the image side surface of the third lens L3;

R7: curvature radius of the object side surface of the fourth lens L4;

R8: curvature radius of the image side surface of the fourth lens L4;

R9: curvature radius of the object side surface of the fifth lens L5;

R10: curvature radius of the image side surface of the fifth lens L5;

R11: curvature radius of the object side surface of the sixth lens L6;

R12: curvature radius of the image side surface of the sixth lens L6;

R13: curvature radius of an object side surface of the optical filter GF;

R14: curvature radius of an image side surface of the optical filter GF;

d: on-axis thickness of a lens and an on-axis distance between lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the fifth lens L5;

d9: on-axis thickness of the fifth lens L5;

d10: on-axis distance from the image side surface of the fifth lens L5 to the object side surface of the sixth lens L6;

d11: on-axis thickness of the sixth lens L6;

d12: on-axis distance from the image side surface of the sixth lens L6 to the object side surface of the optical filter GF;

d13: on-axis thickness of the optical filter GF;

d14: on-axis distance from the image side surface of the optical filter GF to the image plane;

nd: refractive index of d line;

nd1: refractive index of d line of the first lens L1;

nd2: refractive index of d line of the second lens L2;

nd3: refractive index of d line of the third lens L3;

nd4: refractive index of d line of the fourth lens L4;

nd5: refractive index of d line of the fifth lens L5;

nd6: refractive index of d line of the sixth lens L6;

ndg: refractive index of d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

vg: abbe number of the optical filter GF.

Table 2 shows aspheric surface data of respective lens in the camera optical lens 10 according to Embodiment 1 of the present disclosure.

TABLE 2

| | Conic coefficient | Aspherical surface coefficients | | | | | | | | |
|---|---|---|---|---|---|---|---|---|---|---|
| | k | A4 | A6 | A8 | A10 | A12 | A14 | A16 | A18 | A20 |
| R1 | −8.6646E+01 | 1.7517E−02 | −2.0771E−01 | 1.8366E+00 | −1.4163E+01 | 7.2756E+01 | −2.3641E+02 | 4.7660E+02 | −5.4044E+02 | 2.6431E+02 |
| R2 | −8.9901E+01 | −3.7871E−02 | −4.0438E−01 | 1.0821E+01 | −1.4102E+02 | 1.1192E+03 | −5.4313E+03 | 1.5877E+04 | −2.5615E+04 | 1.7622E+04 |
| R3 | 9.9000E+01 | −2.0522E−01 | 3.2317E−02 | −3.4991E+00 | 4.9393E+01 | −4.1972E+02 | 2.1829E+03 | −6.7087E+03 | 1.1241E+04 | −7.8044E+03 |
| R4 | −2.3235E−02 | 1.9331E−01 | −2.8578E+00 | 1.6058E+01 | −7.6289E+01 | 2.7706E+02 | −7.0658E+02 | 1.1701E+03 | −1.1281E+03 | 4.8756E+02 |
| R5 | −9.9000E+01 | 1.1127E−01 | −1.5481E+00 | 6.4294E+00 | −2.3761E+01 | 7.0424E+01 | −1.4544E+02 | 1.8910E+02 | −1.3768E+02 | 4.2796E+01 |

TABLE 2-continued

| | Conic coefficient | Aspherical surface coefficients | | | | | | | | |
|---|---|---|---|---|---|---|---|---|---|---|
| | k | A4 | A6 | A8 | A10 | A12 | A14 | A16 | A18 | A20 |
| R6 | −3.2367E+01 | 9.2513E−02 | 3.0914E−03 | −1.4108E+00 | 4.0798E+00 | −4.8573E+00 | 2.7501E−01 | 5.7725E+00 | −5.8326E+00 | 1.8461E+00 |
| R7 | −5.4258E+01 | −3.2413E−01 | 6.6810E−01 | −2.7383E+00 | 9.3700E+00 | −2.2255E+01 | 3.2638E+01 | −2.7006E+01 | 1.1387E+01 | −1.8713E+00 |
| R8 | −1.5086E+01 | −2.4259E−01 | 2.7776E−01 | −4.6468E−01 | 2.8256E−01 | 7.1754E−01 | −2.1244E+00 | 2.3389E+00 | −1.1942E+00 | 2.3578E−01 |
| R9 | −5.5683E+00 | −4.1714E−02 | −1.9430E−01 | 1.3663E+00 | −4.5689E+00 | 8.7440E+00 | −9.8262E+00 | 6.4501E+00 | −2.2968E+00 | 3.4274E−01 |
| R10 | −3.6039E+00 | −4.8462E−01 | 1.1311E+00 | −2.8685E+00 | 5.5823E+00 | −7.5805E+00 | 6.7243E+00 | −3.5895E+00 | 1.0332E+00 | −1.2269E−01 |
| R11 | −5.7038E−01 | −1.4693E−01 | 6.5172E−02 | −8.9837E−02 | 9.1200E−02 | −5.4547E−02 | 1.9563E−02 | −4.1733E−03 | 4.8830E−04 | −2.4085E−05 |
| R12 | −4.9713E+00 | 1.2386E−02 | −6.6389E−02 | 5.1664E−02 | −2.2675E−02 | 6.2213E−03 | −1.0870E−03 | 1.1749E−04 | −7.1701E−06 | 1.8917E−07 |

In Table 2, k is a conic coefficient, and A4, A6, A8, A10, A12, A14, A16, A18 and A20 are aspheric surface coefficients.

IH: image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (1)$$

In the present embodiment, an aspheric surface of each lens surface uses the aspheric surfaces represented by the above condition (1). However, the present disclosure is not limited to the aspherical polynomial form represented by the condition (1).

Table 3 and Table 4 show design data of inflexion points and arrest points of respective lens in the camera optical lens 10 according to Embodiment 1 of the present disclosure. P1R1 and P1R2 represent the object side surface and the image side surface of the first lens L1, respectively; P2R1 and P2R2 represent the object side surface and the image side surface of the second lens L2, respectively; P3R1 and P3R2 represent the object side surface and the image side surface of the third lens L3, respectively; P4R1 and P4R2 represent the object side surface and the image side surface of the fourth lens L4, respectively; P5R1 and P5R2 represent the object side surface and the image side surface of the fifth lens L5, respectively, and P6R1 and P6R2 represent the object side surface and the image side surface of the sixth lens L6, respectively. The data in the column "inflexion point position" indicates vertical distances from inflexion points arranged on each lens surface to the optic axis of the camera optical lens 10. The data in the column "arrest point position" indicates vertical distances from arrest points arranged on each lens surface to the optic axis of the camera optical lens 10.

TABLE 3

| | Number of inflexion points | Inflexion point position 1 | Inflexion point position 2 | Inflexion point position 3 |
|---|---|---|---|---|
| P1R1 | 0 | | | |
| P1R2 | 0 | | | |
| P2R1 | 2 | 0.125 | 0.545 | |
| P2R2 | 1 | 0.685 | | |
| P3R1 | 2 | 0.235 | 0.815 | |
| P3R2 | 2 | 0.525 | 1.005 | |
| P4R1 | 2 | 0.255 | 0.805 | |
| P4R2 | 2 | 0.335 | 1.095 | |
| P5R1 | 3 | 0.875 | 1.035 | 1.225 |
| P5R2 | 1 | 0.935 | | |
| P6R1 | 3 | 0.705 | 2.035 | 2.045 |
| P6R2 | 1 | 0.685 | | |

TABLE 4

| | Number of arrest points | Arrest point position 1 | Arrest point position 2 |
|---|---|---|---|
| P1R1 | 0 | | |
| P1R2 | 0 | | |
| P2R1 | 1 | 0.215 | |
| P2R2 | 0 | | |
| P3R1 | 1 | 0.325 | |
| P3R2 | 1 | 0.935 | |
| P4R1 | 2 | 0.465 | 1.035 |
| P4R2 | 1 | 0.595 | |
| P5R1 | 0 | | |
| P5R2 | 1 | 1.355 | |
| P6R1 | 1 | 1.395 | |
| P6R2 | 1 | 1.805 | |

Figure 2:
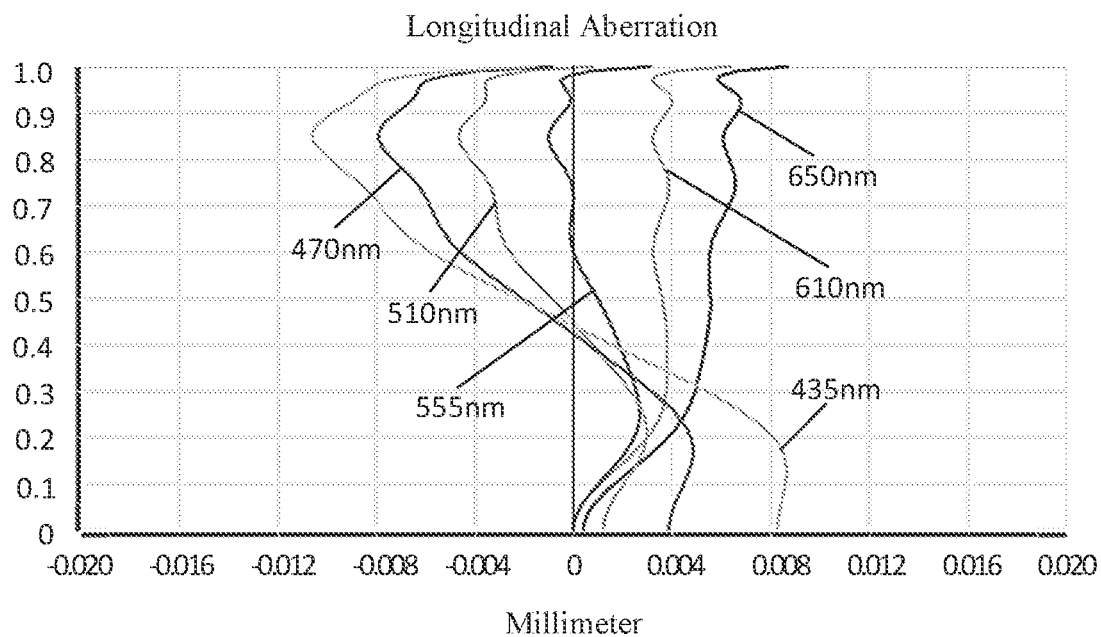
FIG. 2 is a schematic diagram of a longitudinal aberration of the camera optical lens shown in FIG. 1.
Figure 3:
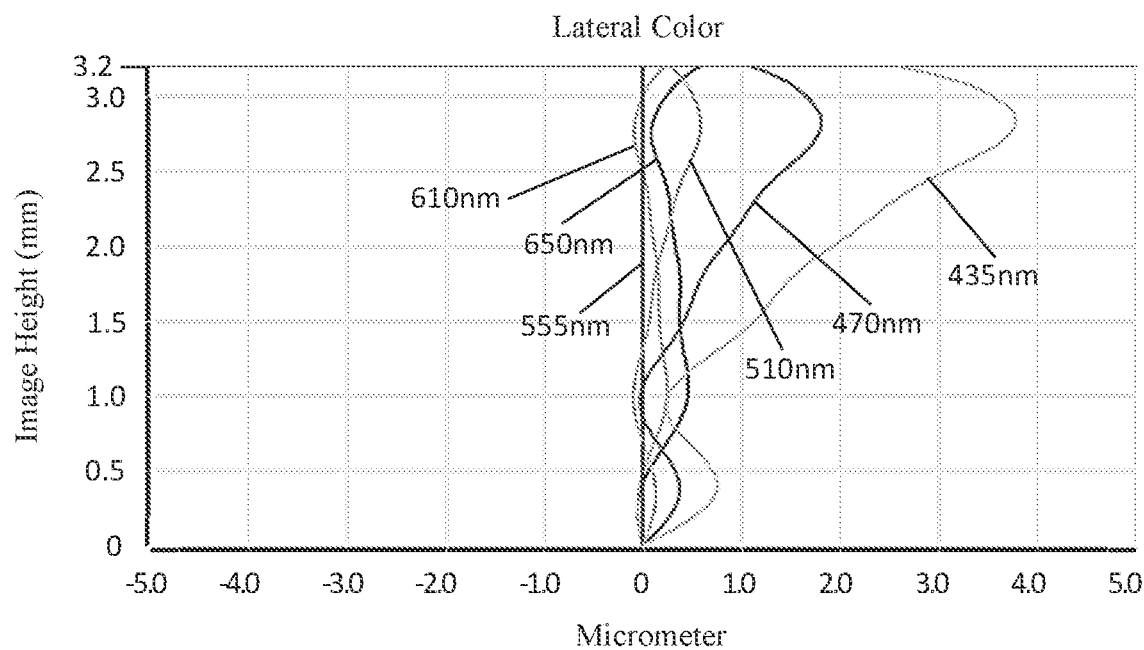
FIG. 3 is a schematic diagram of a lateral color of the camera optical lens shown in FIG. 1.
Figure 4:
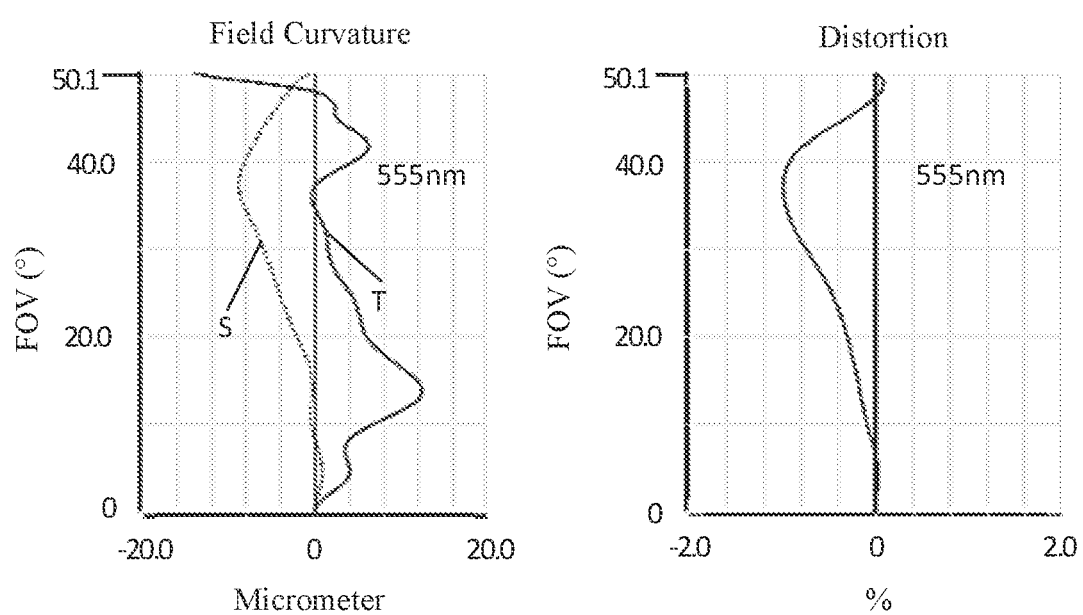
FIG. 4 is a schematic diagram of a field curvature and a distortion of the camera optical lens shown in FIG. 1.
Figure 5:
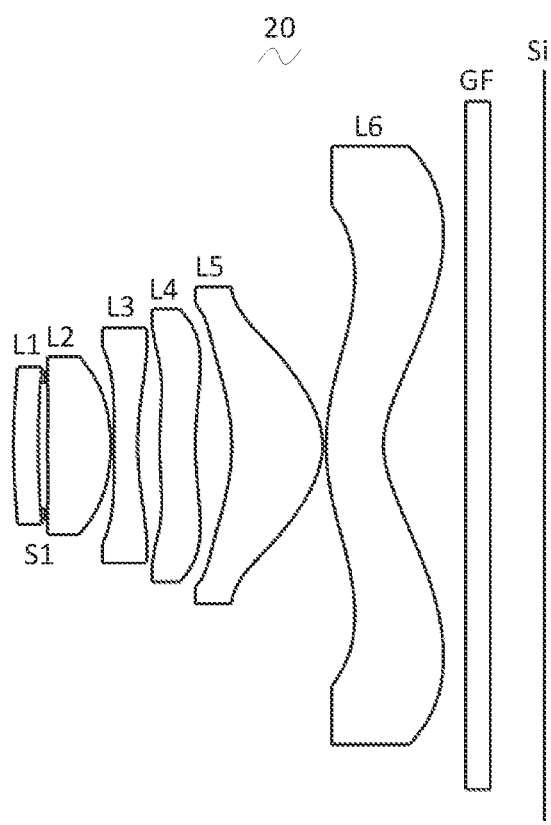
FIG. 5 is a schematic diagram of a structure of a camera optical lens according to Embodiment 2 of the present disclosure.

FIG. 2 and FIG. 3 illustrate a longitudinal aberration and a lateral color of light with wavelengths of 470 nm, 510 nm, 555 nm, 650 nm, 610 nm and 435 nm after passing the camera optical lens 10 according to Embodiment 1. FIG. 4 illustrates a field curvature and a distortion of light with a wavelength of 555 nm after passing the camera optical lens 10 according to Embodiment 1, in which a field curvature S is a field curvature in a sagittal direction and T is a field curvature in a tangential direction.

Table 17 below further lists various values of Embodiments 1, 2, 3, and 4 and parameters which are specified in the above conditions.

As shown in Table 17, Embodiment 1 satisfies the respective conditions.

In the present embodiment, the entrance pupil diameter of the camera optical lens is 1.110 mm. The image height is 3.20 mm. The FOV along a diagonal direction is 100.20°. Thus, the camera optical lens 10 is an ultra-thin, wide-angle lens in which on-axis and off-axis aberrations are sufficiently corrected, thereby leading to better optical characteristics.

Embodiment 2

Embodiment 2 is basically the same as Embodiment 1 and involves symbols having the same meanings as Embodiment 1. Only differences therebetween will be described as below.

The object side surface of the third lens L3 is concave in the paraxial region.

Table 5 and Table 6 show design data of a camera optical lens 20 in Embodiment 2 of the present disclosure.

TABLE 5

| | R | d | nd | vd |
|---|---|---|---|---|
| S1 | ∞ | d0 = −0.270 | | |
| R1 | 4.996 | d1 = 0.210 | nd1 1.6701 | v1 19.39 |
| R2 | 5.720 | d2 = 0.082 | | |

TABLE 5-continued

| | R | d | | nd | | vd |
|---|---|---|---|---|---|---|
| R3 | 8.381 | d3 = | 0.537 | nd2 | 1.5661 | v2 | 37.71 |
| R4 | −1.425 | d4 = | 0.030 | | | |
| R5 | −16.983 | d5 = | 0.200 | nd3 | 1.6701 | v3 | 19.39 |
| R6 | 2.502 | d6 = | 0.188 | | | |
| R7 | 3.155 | d7 = | 0.305 | nd4 | 1.5444 | v4 | 55.82 |
| R8 | 2.672 | d8 = | 0.309 | | | |
| R9 | −1.741 | d9 = | 0.775 | nd5 | 1.5346 | v5 | 55.69 |
| R10 | −0.616 | d10 = | 0.030 | | | |
| R11 | 2.012 | d11 = | 0.489 | nd6 | 1.6701 | v6 | 19.39 |
| R12 | 0.693 | d12 = | 0.700 | | | |
| R13 | ∞ | d13 = | 0.210 | ndg | 1.5168 | vg | 64.17 |
| R14 | ∞ | d14 = | 0.461 | | | |

Table 6 shows aspheric surface data of respective lenses in the camera optical lens 20 according to Embodiment 2 of the present disclosure.

TABLE 6

| | Conic coefficient | Aspherical surface coefficients | | | | | | | | |
|---|---|---|---|---|---|---|---|---|---|---|
| | k | A4 | A6 | A8 | A10 | A12 | A14 | A16 | A18 | A20 |
| R1 | −7.2647E+01 | 8.5806E−03 | −4.1441E−01 | 5.6689E+00 | −4.8782E+01 | 2.6125E+02 | −8.7071E+02 | 1.7722E+03 | −2.0141E+03 | 9.8106E+02 |
| R2 | −7.3723E+01 | −9.6931E−02 | 6.2722E−02 | 2.3153E+00 | −4.6912E+01 | 4.8066E+02 | −2.7125E+03 | 8.8359E+03 | −1.5493E+04 | 1.1444E+04 |
| R3 | 3.5606E+01 | −2.1655E−01 | −3.4843E−01 | 3.6715E+00 | −2.9453E+01 | 1.2167E+02 | −1.1199E+02 | −8.6561E+02 | 3.0932E+03 | −3.0643E+03 |
| R4 | 1.0016E−01 | 3.1777E−01 | −5.0625E+00 | 3.5580E+01 | −1.8386E+02 | 6.6809E+02 | −1.6343E+03 | 2.5434E+03 | −2.2686E+03 | 8.8463E+02 |
| R5 | −9.9000E+01 | 2.7829E−01 | −3.9954E+00 | 2.3641E+01 | −1.0208E+02 | 3.0797E+02 | −6.2005E+02 | 7.8766E+02 | −5.6931E+02 | 1.7821E+02 |
| R6 | −5.0059E+01 | 2.4202E−01 | −1.1242E+00 | 3.6248E+00 | −1.0607E+01 | 2.3858E+01 | −3.7001E+01 | 3.6488E+01 | −2.0322E+01 | 4.8124E+00 |
| R7 | −5.7083E+01 | −2.3164E−01 | 1.6351E−02 | −2.9140E−01 | 1.9195E+00 | −5.3560E+00 | 7.0256E+00 | −3.1870E+00 | −7.5294E−01 | 7.0798E−01 |
| R8 | −9.0571E+00 | −2.4614E−01 | 4.2613E−01 | −1.2379E+00 | 2.4672E+00 | −3.0197E+00 | 1.9903E+00 | −5.5469E−01 | −3.0575E−02 | 3.5467E−02 |
| R9 | −8.2788E+00 | −1.5881E−01 | 4.8563E−01 | −2.0210E−01 | −2.5257E+00 | 7.9719E+00 | −1.1404E+01 | 8.7847E+00 | −3.5341E+00 | 5.8343E−01 |
| R10 | −3.8309E+00 | −5.8120E−01 | 1.6048E+00 | −4.0384E+00 | 7.4249E+00 | −9.4284E+00 | 7.8862E+00 | −4.0387E+00 | 1.1334E+00 | −1.3284E−01 |
| R11 | −6.0385E−01 | −3.2286E−02 | −5.3946E−02 | 2.1701E−03 | 3.7598E−02 | −3.0757E−02 | 1.2021E−02 | −2.6107E−03 | 3.0269E−04 | −1.4632E−05 |
| R12 | −5.5823E+00 | 5.2650E−02 | −1.0601E−01 | 7.2898E−02 | −2.9520E−02 | 7.5304E−03 | −1.2192E−03 | 1.2092E−04 | −6.6589E−06 | 1.5457E−07 |

[0014] Table 7 and Table 8 show design data of inflexion points and arrest points of respective lens in the camera optical lens 20 according to Embodiment 2 of the present disclosure.

TABLE 7

| | Number of inflexion points | Inflexion point position 1 | Inflexion point position 2 | Inflexion point position 3 | Inflexion point position 4 |
|---|---|---|---|---|---|
| P1R1 | 0 | | | | |
| P1R2 | 0 | | | | |
| P2R1 | 2 | 0.215 | 0.535 | | |
| P2R2 | 1 | 0.715 | | | |
| P3R1 | 1 | 0.815 | | | |
| P3R2 | 1 | 0.515 | | | |
| P4R1 | 4 | 0.265 | 0.815 | 0.975 | 1.025 |
| P4R2 | 2 | 0.385 | 1.155 | | |
| P5R1 | 3 | 0.695 | 0.895 | 1.195 | |
| P5R2 | 1 | 0.935 | | | |
| P6R1 | 1 | 0.755 | | | |
| P6R2 | 1 | 0.705 | | | |

TABLE 8

| | Number of arrest points | Arrest point position 1 |
|---|---|---|
| P1R1 | 0 | |
| P1R2 | 0 | |
| P2R1 | 1 | 0.355 |
| P2R2 | 0 | |
| P3R1 | 0 | |
| P3R2 | 1 | 0.905 |

TABLE 8-continued

| | Number of arrest points | Arrest point position 1 |
|---|---|---|
| P4R1 | 1 | 0.475 |
| P4R2 | 1 | 0.685 |
| P5R1 | 0 | |
| P5R2 | 0 | |
| P6R1 | 1 | 1.445 |
| P6R2 | 1 | 1.805 |

Figure 6:
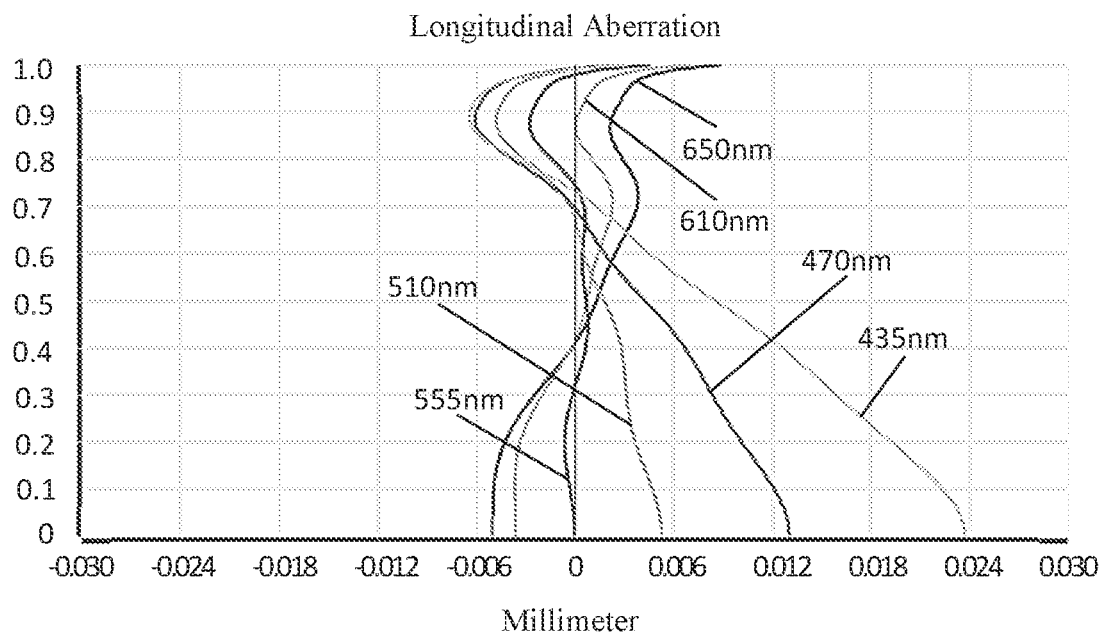
FIG. 6 is a schematic diagram of a longitudinal aberration of the camera optical lens shown in FIG. 5.
Figure 7:
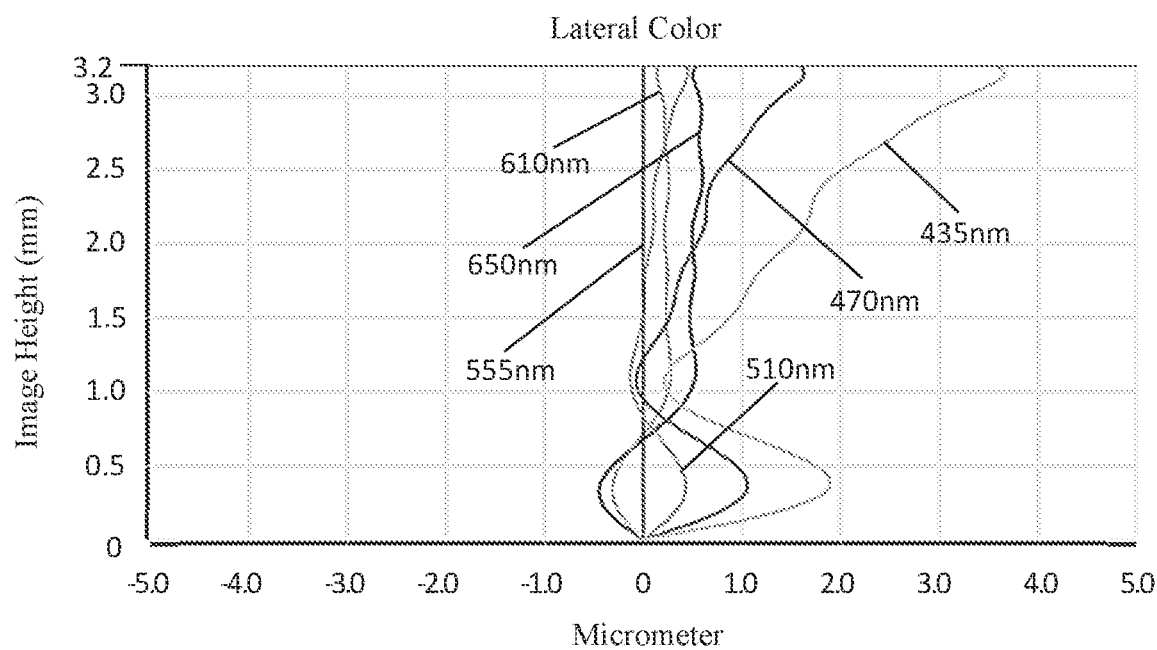
FIG. 7 is a schematic diagram of a lateral color of the camera optical lens shown in FIG. 5.
Figure 8:
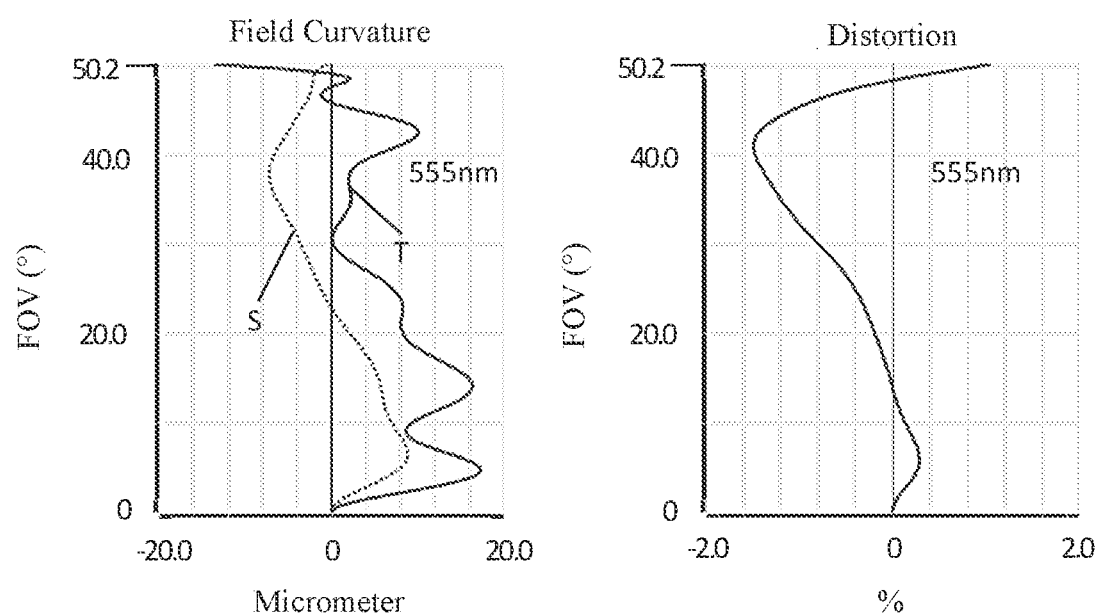
FIG. 8 is a schematic diagram of a field curvature and a distortion of the camera optical lens shown in FIG. 5.
Figure 9:
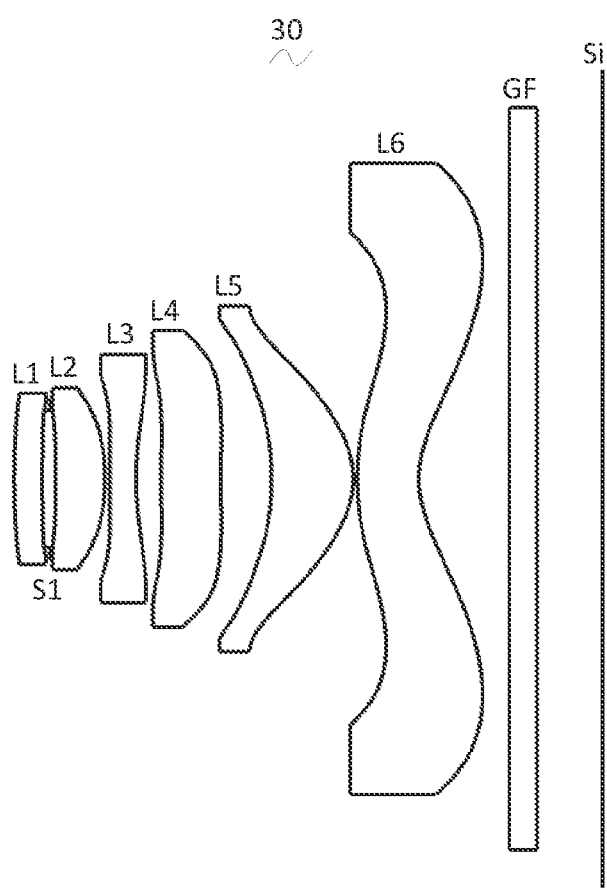
FIG. 9 is a schematic diagram of a structure of a camera optical lens according to Embodiment 3 of the present disclosure.

FIG. 6 and FIG. 7 illustrate a longitudinal aberration and a lateral color of light with wavelengths of 470 nm, 510 nm, 555 nm, 650 nm, 610 nm and 435 nm after passing the camera optical lens 20 according to Embodiment 2. FIG. 8 illustrates a field curvature and a distortion of light with a wavelength of 555 nm after passing the camera optical lens 20 according to Embodiment 2.

As shown in Table 17, Embodiment 2 satisfies the respective conditions.

In the present embodiment, the entrance pupil diameter of the camera optical lens is 1.095 mm. The image height is 3.20 mm. The FOV along a diagonal direction is 100.400. Thus, the camera optical lens 10 is an ultra-thin, wide-angle lens in which the on-axis and off-axis aberrations are sufficiently corrected, thereby leading to better optical characteristics.

Embodiment 3

Embodiment 3 is basically the same as Embodiment 1 and involves symbols having the same meanings as Embodiment 1. Only differences therebetween will be described as below.

The object side surface of the second lens L2 is concave in a paraxial region, the object side surface of the third lens L3 is concave in a paraxial region, and the fourth lens L4 has a positive refractive power.

Table 9 and Table 10 show design data of a camera optical lens 30 in Embodiment 3 of the present disclosure.

TABLE 9

| | R | d | | nd | | vd |
|---|---|---|---|---|---|---|
| S1 | ∞ | d0 = | −0.276 | | | |
| R1 | 5.894 | d1 = | 0.216 | nd1 | 1.6701 | v1 | 19.39 |
| R2 | 16.869 | d2 = | 0.103 | | | |
| R3 | −16.624 | d3 = | 0.382 | nd2 | 1.5661 | v2 | 37.71 |
| R4 | −1.534 | d4 = | 0.038 | | | |
| R5 | −9385.112 | d5 = | 0.200 | nd3 | 1.6701 | v3 | 19.39 |

TABLE 9-continued

| | R | d | | nd | | vd |
|---|---|---|---|---|---|---|
| R6 | 2.426 | d6 = | 0.195 | | | |
| R7 | 9.150 | d7 = | 0.458 | nd4 | 1.5444 | v4 55.82 |
| R8 | 9.083 | d8 = | 0.393 | | | |
| R9 | −2.476 | d9 = | 0.630 | nd5 | 1.5346 | v5 55.69 |
| R10 | −0.655 | d10 = | 0.030 | | | |
| R11 | 2.235 | d11 = | 0.474 | nd6 | 1.6701 | v6 19.39 |
| R12 | 0.757 | d12 = | 0.700 | | | |
| R13 | ∞ | d13 = | 0.210 | ndg | 1.5168 | vg 64.17 |
| R14 | ∞ | d14 = | 0.503 | | | |

Table 10 shows aspheric surface data of respective lenses in the camera optical lens 30 according to Embodiment 3 of the present disclosure.

TABLE 10

| | Conic coefficient | Aspherical surface coefficients | | | | | | | | |
|---|---|---|---|---|---|---|---|---|---|---|
| | k | A4 | A6 | A8 | A10 | A12 | A14 | A16 | A18 | A20 |
| R1 | −2.8771E+01 | −1.2176E−02 | 4.0770E−01 | −5.5724E+00 | 4.8006E+01 | −2.5689E+02 | 8.6618E+02 | −1.7820E+03 | 2.0491E+03 | −1.0076E+03 |
| R2 | 8.3646E+00 | 1.1629E−02 | −5.8036E−01 | 1.3675E+01 | −1.6791E+02 | 1.2927E+03 | −6.2131E+03 | 1.8288E+04 | −3.0122E+04 | 2.1474E+04 |
| R3 | −9.9000E+01 | −1.5139E−01 | −3.3579E−01 | 2.6983E+00 | −1.6534E+01 | −1.3352E+01 | 7.4571E+01 | −3.9952E+03 | 9.1625E+03 | −7.7974E+03 |
| R4 | 1.9937E−01 | 2.4999E−01 | −4.3194E+00 | 2.8710E+01 | −1.4604E+02 | 5.3595E+02 | −1.3705E+03 | 2.3255E+03 | −2.3712E+03 | 1.1207E+03 |
| R5 | −9.8983E+01 | 2.2093E−01 | −3.6324E+00 | 2.1370E+01 | −9.1463E+01 | 2.7110E+02 | −5.3350E+02 | 6.6031E+02 | −4.6417E+02 | 1.4198E+02 |
| R6 | −6.3606E+01 | 3.9814E−01 | −2.3379E+00 | 9.2025E+00 | −2.7818E+01 | 5.9705E+01 | −8.6533E+01 | 7.9882E+01 | −4.2064E+01 | 9.5456E+00 |
| R7 | 3.8094E+00 | −3.0630E−01 | 8.5633E−01 | −3.9154E+00 | 1.1924E+01 | −2.2654E+01 | 2.5642E+01 | −1.5553E+01 | 4.0080E+00 | −1.2302E−01 |
| R8 | −9.9000E+01 | −3.3812E−01 | 1.2134E+00 | −4.3005E+00 | 9.9938E+00 | −1.5762E+01 | 1.6483E+01 | −1.1000E+01 | 4.2372E+00 | −7.1058E−01 |
| R9 | −7.7929E−01 | −4.3583E−01 | 1.5465E+00 | −2.7224E+00 | 2.0439E+00 | 8.6377E−01 | −3.1157E+00 | 2.6514E+00 | −1.0374E+00 | 1.6068E−01 |
| R10 | −3.3121E+00 | −4.1326E−01 | 7.4781E−01 | −1.1958E+00 | 1.5808E+00 | −1.8951E+00 | 1.8015E+00 | −1.0684E+00 | 3.3547E−01 | −4.2415E−02 |
| R11 | 1.7791E−01 | 6.1176E−02 | −1.6316E−01 | −1.3653E−02 | 1.5016E−01 | −1.3152E−01 | 5.7550E−02 | −1.4198E−02 | 1.8823E−03 | −1.0446E−04 |
| R12 | −4.9686E+00 | 9.8714E−02 | −2.0876E−01 | 1.6436E−01 | −7.6168E−02 | 2.2286E−02 | −4.1603E−03 | 4.8009E−04 | −3.1194E−05 | 8.7290E−07 |

Table 11 and Table 12 show design data of inflexion points and arrest points of respective lens in the camera optical lens 30 according to Embodiment 3 of the present disclosure.

TABLE 11

| | Number of inflexion points | Inflexion point position 1 | Inflexion point position 2 | Inflexion point position 3 |
|---|---|---|---|---|
| P1R1 | 0 | | | |
| P1R2 | 0 | | | |
| P2R1 | 1 | 0.515 | | |
| P2R2 | 1 | 0.645 | | |
| P3R1 | 3 | 0.015 | 0.195 | 0.765 |
| P3R2 | 1 | 0.495 | | |
| P4R1 | 3 | 0.195 | 0.805 | 0.985 |
| P4R2 | 1 | 0.185 | | |
| P5R1 | 1 | 1.195 | | |
| P5R2 | 1 | 0.955 | | |
| P6R1 | 2 | 0.725 | 1.925 | |
| P6R2 | 1 | 0.695 | | |

TABLE 12

| | Number of arrest points | Arrest point position 1 | Arrest point position 2 |
|---|---|---|---|
| P1R1 | 0 | | |
| P1R2 | 0 | | |
| P2R1 | 0 | | |
| P2R2 | 0 | | |
| P3R1 | 2 | 0.015 | 0.255 |
| P3R2 | 1 | 0.905 | |
| P4R1 | 1 | 0.345 | |
| P4R2 | 1 | 0.355 | |
| P5R1 | 0 | | |

TABLE 12-continued

| | Number of arrest points | Arrest point position 1 | Arrest point position 2 |
|---|---|---|---|
| P5R2 | 1 | 1.335 | |
| P6R1 | 1 | 1.305 | |
| P6R2 | 1 | 1.695 | |

Figure 10:
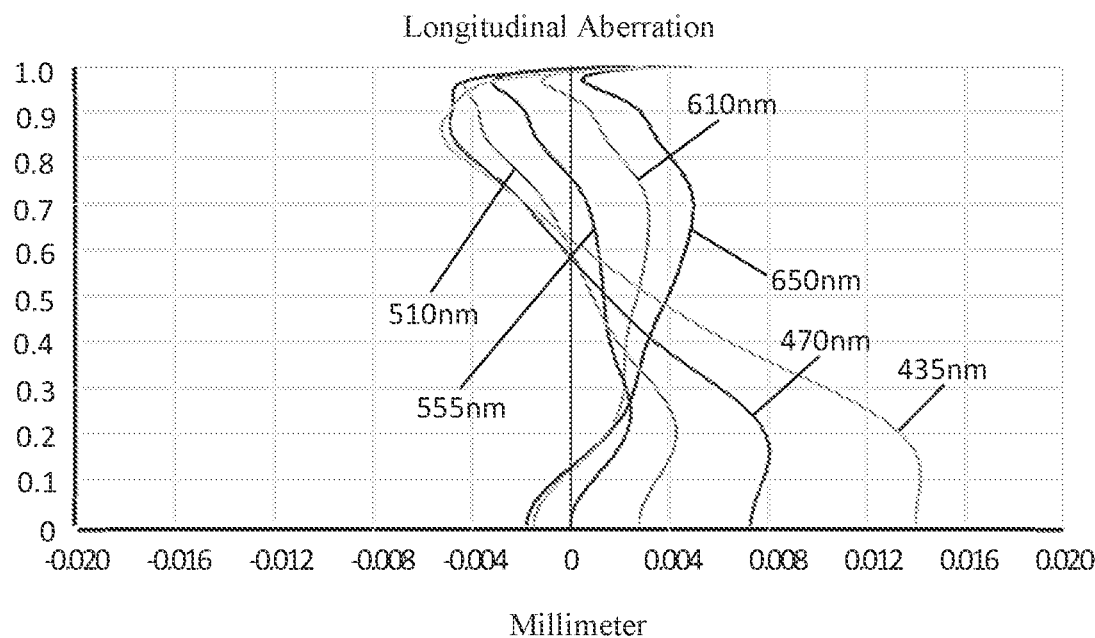
FIG. 10 is a schematic diagram of a longitudinal aberration of the camera optical lens shown in FIG. 9.
Figure 11:
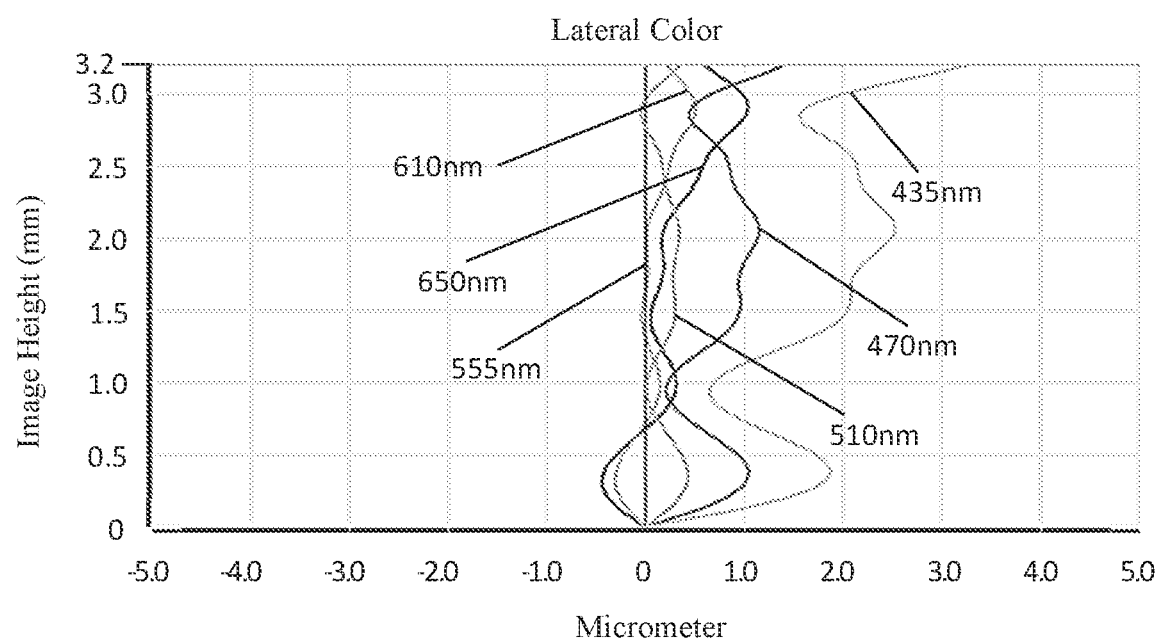
FIG. 11 is a schematic diagram of a lateral color of the camera optical lens shown in FIG. 9.
Figure 12:
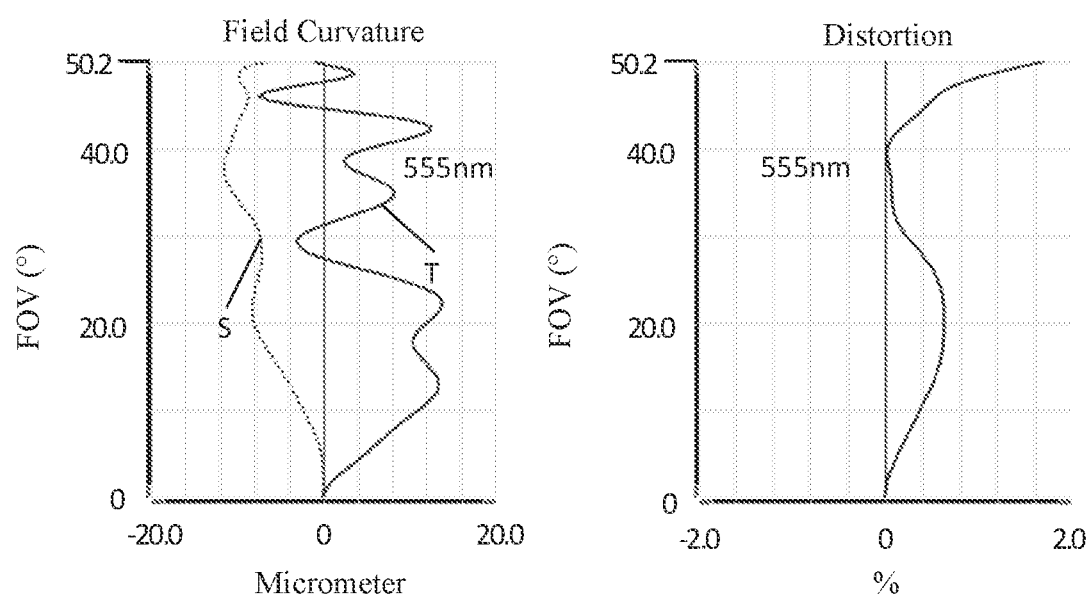
FIG. 12 is a schematic diagram of a field curvature and a distortion of the camera optical lens shown in FIG. 9.
Figure 13:
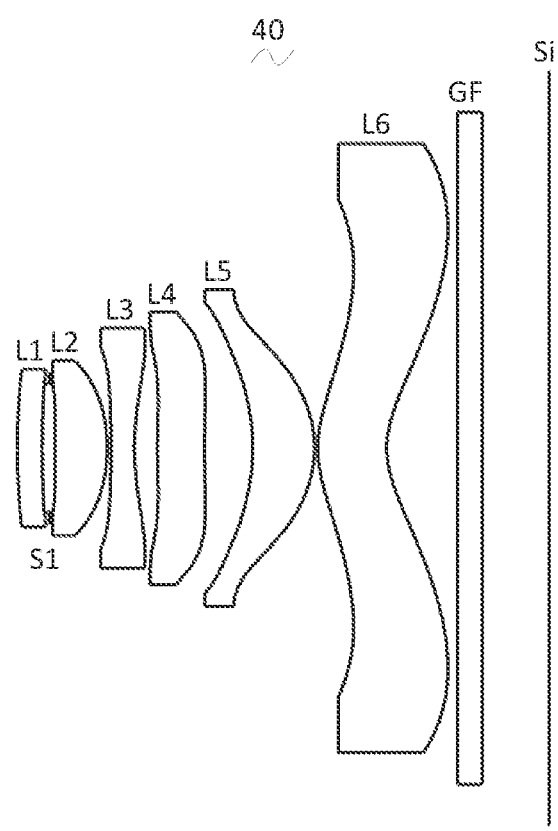
FIG. 13 is a schematic diagram of a structure of a camera optical lens according to Embodiment 4 of the present disclosure.

FIG. 10 and FIG. 11 illustrate a longitudinal aberration and a lateral color of light with wavelengths of 470 nm, 510 nm, 555 nm, 650 nm, 610 nm and 435 after passing the camera optical lens 30 according to Embodiment 3. FIG. 12 illustrates field curvature and distortion of light with a wavelength of 555 nm after passing the camera optical lens 30 according to Embodiment 3.

Table 17 below further lists various values of the present embodiment and parameters which are specified in the above conditions. Obviously, the camera optical lens according to the present embodiment satisfies the above conditions.

In the present embodiment, the entrance pupil diameter of the camera optical lens is 1.088 mm. The image height is 3.20 mm. The FOV along a diagonal direction is 100.40°. Thus, the camera optical lens 10 is an ultra-thin, wide-angle lens in which the on-axis and off-axis aberrations are sufficiently corrected, thereby leading to better optical characteristics.

Embodiment 4

Embodiment 4 is basically the same as Embodiment 1 and involves symbols having the same meanings as Embodiment 1. Only differences therebetween will be described as below.

The object side surface of the third lens L3 is concave in a paraxial region, the fourth lens L4 has a positive refractive power, and the sixth lens L6 has a positive refractive power.

Table 13 and Table 14 show design data of a camera optical lens 40 in Embodiment 4 of the present disclosure.

TABLE 13

| | R | d | | nd | | vd |
|---|---|---|---|---|---|---|
| S1 | ∞ | d0 = | −0.270 | | | |
| R1 | 5.468 | d1 = | 0.210 | nd1 | 1.6701 | v1 19.39 |
| R2 | 6.964 | d2 = | 0.109 | | | |
| R3 | 19.441 | d3 = | 0.444 | nd2 | 1.5661 | v2 37.71 |
| R4 | −1.293 | d4 = | 0.030 | | | |
| R5 | −19.862 | d5 = | 0.200 | nd3 | 1.6701 | v3 19.39 |
| R6 | 2.107 | d6 = | 0.197 | | | |

TABLE 13-continued

| | R | d | | nd | | vd |
|---|---|---|---|---|---|---|
| R7 | 6.319 | d7 = | 0.397 | nd4 | 1.5444 | v4 55.82 |
| R8 | 6.256 | d8 = | 0.412 | | | |
| R9 | −1.469 | d9 = | 0.521 | nd5 | 1.5346 | v5 55.69 |
| R10 | −1.048 | d10 = | 0.030 | | | |
| R11 | 1.037 | d11 = | 0.585 | nd6 | 1.6701 | v6 19.39 |
| R12 | 0.801 | d12 = | 0.520 | | | |
| R13 | ∞ | d13 = | 0.210 | ndg | 1.5168 | vg 64.17 |
| R14 | ∞ | d14 = | 0.648 | | | |

Table 14 shows aspheric surface data of respective lenses in the camera optical lens 40 according to Embodiment 4 of the present disclosure.

TABLE 14

| | Conic coefficient | Aspherical surface coefficients | | | | | | | | |
|---|---|---|---|---|---|---|---|---|---|---|
| | k | A4 | A6 | A8 | A10 | A12 | A14 | A16 | A18 | A20 |
| R1 | −6.5260E+01 | −2.3859E−04 | −6.0213E−02 | 1.1646E+00 | −1.0775E+01 | 6.1870E+01 | −2.1736E+02 | 4.6389E+02 | −5.4845E+02 | 2.7654E+02 |
| R2 | −9.3244E+01 | −5.3551E−02 | −2.3247E−01 | 8.0865E+00 | −1.0570E+02 | 8.5104E+02 | −4.2073E+03 | 1.2584E+04 | −2.0840E+04 | 1.4773E+04 |
| R3 | −9.6301E+01 | −2.4602E−01 | −3.0345E−01 | 2.9467E+00 | −2.5550E+01 | 1.1486E+02 | −1.8603E+02 | −3.6971E+02 | 1.8510E+03 | −1.8880E+03 |
| R4 | −1.1059E−01 | 2.6864E−01 | −3.2911E+00 | 1.9440E+01 | −9.3296E+01 | 3.3110E+02 | −8.2353E+02 | 1.3430E+03 | −1.2876E+03 | 5.5443E+02 |
| R5 | −9.8899E+01 | 1.1407E−01 | −1.7780E+00 | 9.2124E+00 | −3.5914E+01 | 9.9844E+01 | −1.8833E+02 | 2.2580E+02 | −1.5412E+02 | 4.5385E+01 |
| R6 | −4.1371E+01 | 2.1081E−01 | −8.8524E−01 | 2.5485E+00 | −6.6384E+00 | 1.3443E+01 | −1.9250E+01 | 1.7917E+01 | −9.5266E+00 | 2.1536E+00 |
| R7 | −3.5518E+01 | −3.2358E−01 | 5.0307E−01 | −1.1939E+00 | 2.5642E+00 | −4.8672E+00 | 6.4162E+00 | −4.2414E+00 | 9.1219E−01 | 1.0125E−01 |
| R8 | −6.8530E+00 | −1.4655E−01 | −4.2137E−01 | 2.4131E+00 | −7.1653E+00 | 1.3048E+01 | −1.5273E+01 | 1.1041E+01 | −4.4470E+00 | 7.6235E−01 |
| R9 | −9.8882E+00 | 2.6277E−01 | −2.1481E+00 | 7.0233E+00 | −1.5007E+01 | 2.1942E+01 | −2.1237E+01 | 1.2845E+01 | −4.3697E+00 | 6.3554E−01 |
| R10 | −2.9950E+00 | −3.2829E−01 | 1.1243E−01 | 1.8755E−01 | −6.3824E−02 | −8.2174E−01 | 1.6341E+00 | −1.2952E+00 | 4.7178E−01 | −6.5614E−02 |
| R11 | −8.6651E−01 | −4.8824E−01 | 3.9234E−01 | −2.4857E−01 | 1.1212E−01 | −3.6201E−02 | 8.2600E−03 | −1.2729E−03 | 1.1861E−04 | −5.0056E−06 |
| R12 | −2.3258E+00 | −2.4675E−01 | 2.1311E−01 | −1.2334E−01 | 4.7595E−02 | −1.2313E−02 | 2.1045E−03 | −2.2763E−04 | 1.4100E−05 | −3.8068E−07 |

Table 15 and Table 16 show design data of inflexion points and arrest points of respective lens in the camera optical lens 40 according to Embodiment 4 of the present disclosure.

TABLE 15

| | Number of inflexion points | Inflexion point position 1 | Inflexion point position 2 |
|---|---|---|---|
| P1R1 | 0 | | |
| P1R2 | 0 | | |
| P2R1 | 2 | 0.135 | 0.555 |
| P2R2 | 1 | 0.705 | |
| P3R1 | 0 | | |
| P3R2 | 1 | 0.535 | |
| P4R1 | 2 | 0.215 | 0.805 |
| P4R2 | 2 | 0.275 | 1.095 |
| P5R1 | 1 | 1.215 | |
| P5R2 | 1 | 0.905 | |
| P6R1 | 1 | 0.565 | |
| P6R2 | 1 | 0.635 | |

TABLE 16

| | Number of arrest points | Arrest point position 1 |
|---|---|---|
| P1R1 | 0 | |
| P1R2 | 0 | |
| P2R1 | 1 | 0.225 |
| P2R2 | 0 | |
| P3R1 | 0 | |
| P3R2 | 1 | 0.915 |
| P4R1 | 1 | 0.385 |
| P4R2 | 1 | 0.475 |
| P5R1 | 0 | |

TABLE 16-continued

| | Number of arrest points | Arrest point position 1 |
|---|---|---|
| P5R2 | 1 | 1.335 |
| P6R1 | 1 | 1.525 |
| P6R2 | 1 | 1.865 |

Figure 14:
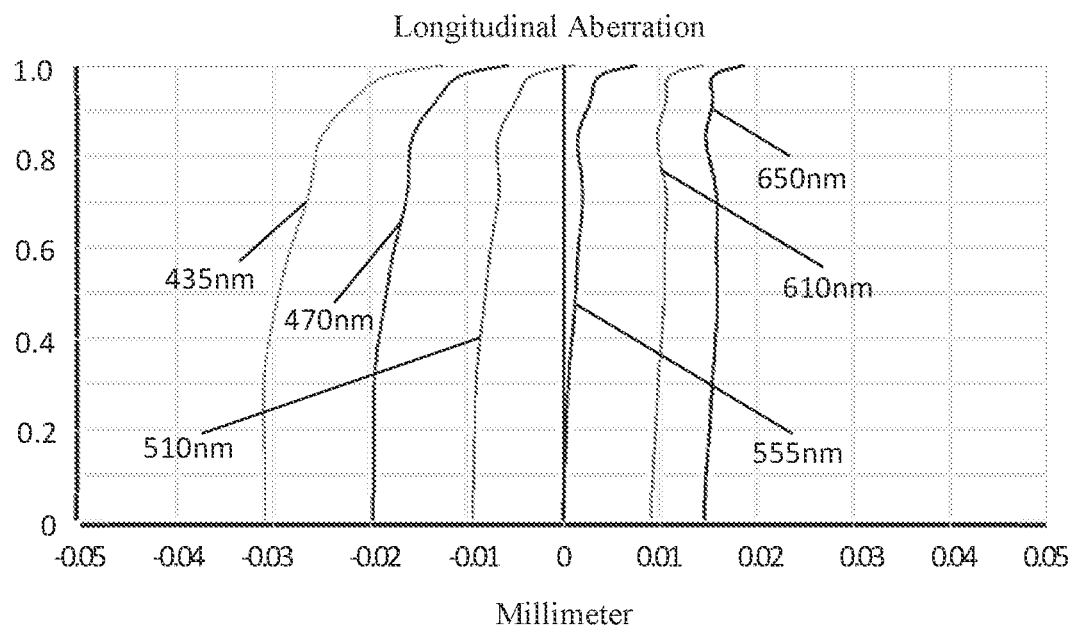
FIG. 14 is a schematic diagram of a longitudinal aberration of the camera optical lens shown in FIG. 13.
Figure 15:
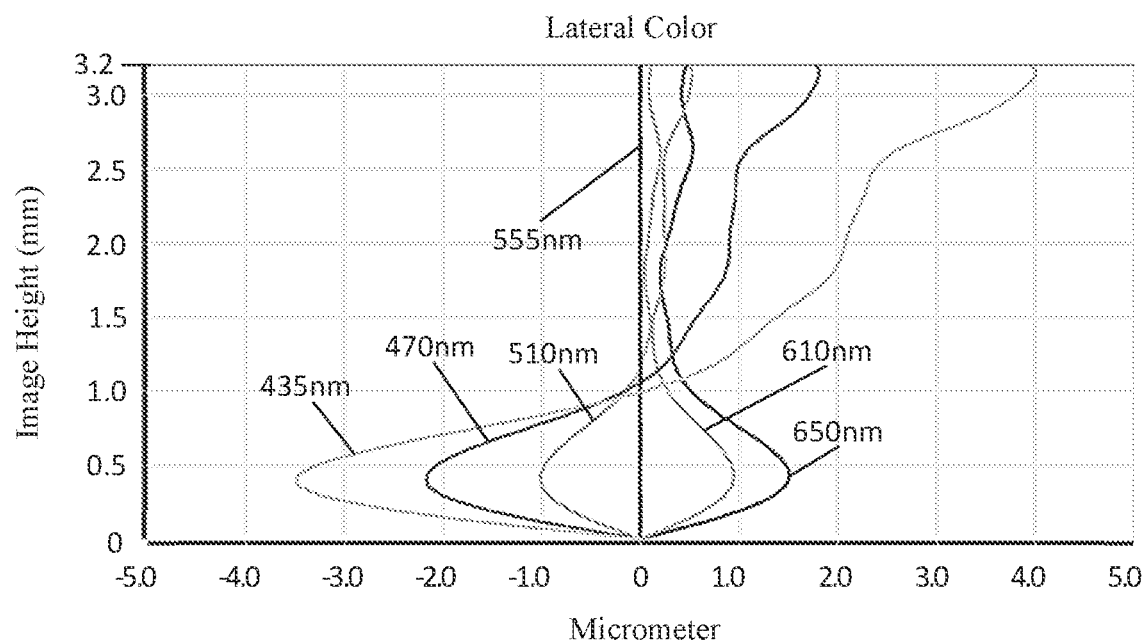
FIG. 15 is a schematic diagram of a lateral color of the camera optical lens shown in FIG. 13.
Figure 16:
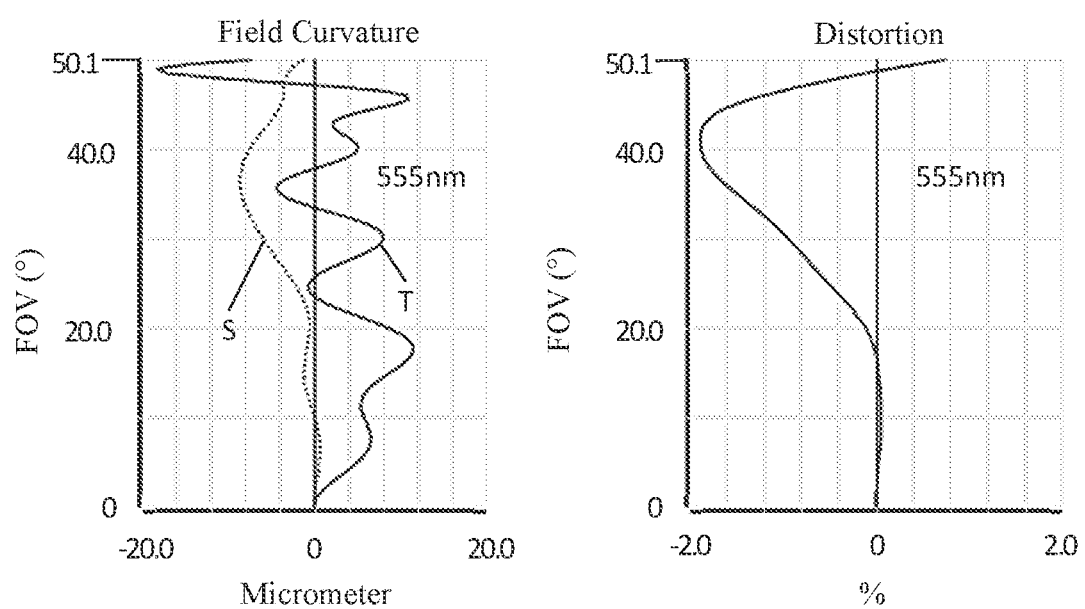
FIG. 16 is a schematic diagram of a field curvature and a distortion of the camera optical lens shown in FIG. 13.

FIG. 14 and FIG. 15 illustrate a longitudinal aberration and a lateral color of light with wavelengths of 470 nm, 510 nm, 555 nm, 650 nm, 610 nm and 435 nm after passing the camera optical lens 40 according to Embodiment 4. FIG. 16 illustrates field curvature and distortion of light with a wavelength of 555 nm after passing the camera optical lens 40 according to Embodiment 4.

Table 17 below further lists various values of the present embodiment and parameters which are specified in the above conditions. Obviously, the camera optical lens according to the present embodiment satisfies the above conditions.

In the present embodiment, the entrance pupil diameter of the camera optical lens is 1.102 mm. The image height is 3.20 mm. The FOV along a diagonal direction is 100.20°. Thus, the camera optical lens 10 is an ultra-thin, wide-angle lens in which the on-axis and off-axis aberrations are sufficiently corrected, thereby leading to better optical characteristics.

TABLE 17

| Parameters and Conditions | Embodiment 1 | Embodiment 2 | Embodiment 3 | Embodiment 4 |
|---|---|---|---|---|
| f | 2.664 | 2.629 | 2.611 | 2.645 |
| f1 | 41.110 | 52.304 | 13.289 | 35.617 |
| f2 | 2.377 | 2.185 | 2.945 | 2.148 |
| f3 | −3.404 | −3.211 | −3.586 | −2.807 |
| f4 | −853.967 | −41.107 | 1606.760 | 933.311 |
| f5 | 1.768 | 1.433 | 1.483 | 4.759 |
| f6 | −2.397 | −1.837 | −1.946 | 3102.240 |
| f12 | 2.303 | 2.147 | 2.498 | 2.076 |
| Fno | 2.40 | 2.40 | 2.40 | 2.40 |
| f1/f | 15.43 | 19.90 | 5.09 | 13.47 |
| (R7 + R8)/(R7 − R8) | 47.41 | 12.06 | 272.13 | 199.60 |
| (R11 + R12)/(R11 − R12) | 2.52 | 2.05 | 2.02 | 7.79 |

In Table 17, Fno denotes an F number of the camera optical lens.

It can be understood that the above-described embodiments are parts of the present disclosure. In practice, those skilled in the art can make various modifications to these embodiments in forms and details without departing from the spirit and scope of the present disclosure.

What is claimed is:

1. A camera optical lens, substantially consisting of, from an object side to an image side:
   a first lens having a positive refractive power;
   a second lens having a positive refractive power;
   a third lens having a negative refractive power;
   a fourth lens;
   a fifth lens having a positive refractive power; and
   a sixth lens;
   wherein the camera optical lens satisfies following conditions:

$5.00 \leq f1/f \leq 20.00$;

$12.00 \leq (R7+R8)/(R7-R8)$; and $2.00 \leq (R11+R12)/(R11-R12) \leq 8.00$, where
   f denotes a focal length of the camera optical lens;
   f1 denotes a focal length of the first lens;
   R7 denotes a curvature radius of an object side surface of the fourth lens;
   R8 denotes a curvature radius of an image side surface of the fourth lens;
   R11 denotes a curvature radius of an object side surface of the sixth lens; and
   R12 denotes a curvature radius of an image side surface of the sixth lens.

2. The camera optical lens as described in claim 1, further satisfying a following condition:

$10.00 \leq d3/d4 \leq 18.00$, where
   d3 denotes an on-axis thickness of the second lens; and
   d4 denotes an on-axis distance from an image side surface of the second lens to an object side surface of the third lens.

3. The camera optical lens as described in claim 1, further satisfying following conditions:

$-29.60 \leq (R1+R2)/(R1-R2) \leq -1.38$; and $0.02 \leq d1/TTL \leq 0.07$, where
   R1 denotes a curvature radius of an object side surface of the first lens;
   R2 denotes a curvature radius of an image side surface of the first lens;
   d1 denotes an on-axis thickness of the first lens; and
   TTL denotes a total optical length from the object side surface of the first lens to an image plane of the camera optical lens along an optic axis.

4. The camera optical lens as described in claim 1, further satisfying following conditions:

$0.41 \leq f2/f \leq 1.69$;

$0.35 \leq (R3+R4)/(R3-R4) \leq 1.80$; and $0.04 \leq d3/TTL \leq 0.18$, where
   f2 denotes a focal length of the second lens;
   R3 denotes a curvature radius of an object side surface of the second lens;
   R4 denotes a curvature radius of an image side surface of the second lens;
   d3 denotes an on-axis thickness of the second lens; and
   TTL denotes a total optical length from an object side surface of the first lens to an image plane of the camera optical lens along an optic axis.

5. The camera optical lens as described in claim 1, further satisfying following conditions:

$-2.75 \leq f3/f \leq -0.71$;

$0.37 \leq (R5+R6)/(R5-R6) \leq 1.62$; and $0.02 \leq d5/TTL \leq 0.07$, where
   f3 denotes a focal length of the third lens;
   R5 denotes a curvature radius of an object side surface of the third lens;
   R6 denotes a curvature radius of an image side surface of the third lens;
   d5 denotes an on-axis thickness of the third lens; and
   TTL denotes a total optical length from an object side surface of the first lens to an image plane of the camera optical lens along an optic axis.

6. The camera optical lens as described in claim 1, further satisfying following conditions:

$-641.12 \leq f4/f \leq 923.07$; and $0.03 \leq d7/TTL \leq 0.15$, where
   f4 denotes a focal length of the fourth lens;
   d7 denotes an on-axis thickness of the fourth lens; and
   TTL denotes a total optical length from an object side surface of the first lens to an image plane of the camera optical lens along an optic axis.

7. The camera optical lens as described in claim 1, further satisfying following conditions:

$0.27 \leq f5/f \leq 2.70$;

$0.86 \leq (R9+R10)/(R9-R10) \leq 8.97$; and $0.06 \leq d9/TTL \leq 0.26$, where
   f5 denotes a focal length of the fifth lens;
   R9 denotes a curvature radius of an object side surface of the fifth lens;
   R10 denotes a curvature radius of an image side surface of the fifth lens;
   d9 denotes an on-axis thickness of the fifth lens; and
   TTL denotes a total optical length from an object side surface of the first lens to an image plane of the camera optical lens along an optic axis.

8. The camera optical lens as described in claim 1, further satisfying following conditions:

$-1.80 \leq f6/f \leq 1759.30$; and $0.05 \leq d11/TTL \leq 0.19$, where
   f6 denotes a focal length of the sixth lens;
   d11 denotes an on-axis thickness of the sixth lens; and
   TTL denotes a total optical length from an object side surface of the first lens to an image plane of the camera optical lens along an optic axis.

9. The camera optical lens as described in claim 1, further satisfying a following condition:

$TTL/IH \leq 1.42$, where
TTL denotes a total optical length from an object side surface of the first lens to an image plane of the camera optical lens along an optic axis; and
IH denotes an image height of the camera optical lens.

10. The camera optical lens as described in claim 1, further satisfying a following condition:

$FOV \geq 100.00°$, where
FOV denotes a field of view of the camera optical lens.

* * * * *